(12) United States Patent
Vertes et al.

(10) Patent No.: US 7,735,146 B2
(45) Date of Patent: Jun. 8, 2010

(54) PROTEIN MICROSCOPE

(75) Inventors: Akos Vertes, Reston, VA (US); Mark E. Reeves, Arlington, VA (US); Fatah Kashanchi, North Bethesda, MD (US)

(73) Assignee: The George Washington University, Washington, DC (US)

( * ) Notice: Subject to any disclaimer, the term of this patent is extended or adjusted under 35 U.S.C. 154(b) by 135 days.

(21) Appl. No.: 11/795,687

(22) PCT Filed: Jan. 26, 2006

(86) PCT No.: PCT/US2006/002483

§ 371 (c)(1),
(2), (4) Date: Jul. 20, 2007

(87) PCT Pub. No.: WO2006/081240

PCT Pub. Date: Aug. 3, 2006

(65) Prior Publication Data

US 2008/0149822 A1  Jun. 26, 2008

Related U.S. Application Data

(60) Provisional application No. 60/646,994, filed on Jan. 27, 2005.

(51) Int. Cl.
*H01J 49/40* (2006.01)
(52) U.S. Cl. .......................... 850/9; 250/281; 250/282; 250/287; 250/288; 850/21; 850/30; 850/32
(58) Field of Classification Search .................. 250/281, 250/282, 283, 284, 285, 286, 287, 288, 306, 250/307, 309, 310, 311, 440.11; 850/1, 2, 850/5, 6, 8, 9, 10, 12, 21, 22, 30, 32
See application file for complete search history.

(56) References Cited

U.S. PATENT DOCUMENTS 5,117,107 A   5/1992   Guilhaus et al.
5,808,300 A   9/1998   Caprioli
(Continued)

FOREIGN PATENT DOCUMENTS

JP   2004-264043   *  9/2004
(Continued)

OTHER PUBLICATIONS

Stockle et al., Nanoscale Atmospheric Pressure Laser Ablation-Mass Spectrometry, *Analytical Chemistry*, 2001, vol. 73, No. 7, pp. 1399-1402.
(Continued)

*Primary Examiner*—Jack I Berman
*Assistant Examiner*—Nicole Ippolito Rausch
(74) *Attorney, Agent, or Firm*—Blank Rome LLP

(57) ABSTRACT

A system and method for analyzing and imaging a sample containing molecules of interest combines modified MALDI mass spectrometer and SNOM devices and techniques, and includes: (A) an atmospheric-pressure or near-atmospheric-pressure ionization region; (B) a sample holder for holding the sample; (C) a laser for illuminating said sample; (D) a mass spectrometer having at least one evacuated vacuum chamber; (E) an atmospheric pressure interface connecting said ionization region and said mass spectrometer; (F) a scanning near-field optical microscopy instrument comprising a near-field probe for scanning the sample; a vacuum capillary nozzle for sucking in particles which are desorbed by said laser, the nozzle being connected to an inlet orifice of said atmospheric pressure interface; a scanner platform connected to the sample holder, the platform being movable to a distance within a near-field distance of the probe; and a controller for maintaining distance information about a current distance between said probe and said sample; (G) a recording device for recording topography and mass spectrum measurements made during scanning of the sample with the near-field probe; (H) a plotting device for plotting said topography and mass spectrum measurements as separate x-y mappings; and (I) an imaging device for providing images of the x-y mappings.

20 Claims, 5 Drawing Sheets

U.S. PATENT DOCUMENTS

| | | | |
|---|---|---|---|
| 5,994,691 | A | 11/1999 | Konada |
| 6,080,586 | A * | 6/2000 | Baldeschwieler et al. ... 436/173 |
| 6,466,309 | B1 | 10/2002 | Kossakovski et al. |
| 6,791,080 | B2 | 9/2004 | Doroshenko et al. |
| 6,855,924 | B2 | 2/2005 | Kobayashi et al. |
| 6,888,132 | B1 * | 5/2005 | Sheehan et al. ............ 250/288 |
| 2001/0013579 | A1 * | 8/2001 | Andrien et al. ......... 250/423 R |
| 2003/0001089 | A1 * | 1/2003 | Reilly et al. ................ 250/287 |
| 2003/0134273 | A1 * | 7/2003 | Henderson .................... 435/5 |
| 2004/0051037 | A1 * | 3/2004 | Taylor et al. ................ 250/288 |
| 2004/0217274 | A1 * | 11/2004 | Bai et al. .................... 250/282 |
| 2005/0056776 | A1 * | 3/2005 | Willoughby et al. ........ 250/281 |
| 2006/0097164 | A1 * | 5/2006 | Knebel et al. ............... 250/310 |
| 2006/0163471 | A1 * | 7/2006 | Zapata et al. ............... 250/288 |

FOREIGN PATENT DOCUMENTS

| | | |
|---|---|---|
| WO | WO 2004/17019 A1 | 2/2004 |
| WO | WO 2004/068131 A1 | 8/2004 |
| WO | WO 2006/081240 A1 | 8/2006 |

OTHER PUBLICATIONS

Coon et al., Laser Desorption-Atmospheric Pressure Chemical Ionization Mass Spectrometry for the Analysis of Peptides from Aqueous Solutions, *Analytical Chemistry*, Nov. 1, 2002, vol. 74, No. 21, pp. 5600-5605.

Rasmussen et al., New Dimension in Nano-Imaging: Breaking Through the Diffraction Limit with Scanning Near-Field Optical Microscopy, *Anal Bioanal Chem*, 2005, vol. 381, pp. 165-172.

Takubo Kenji, Ionizing Device and Mass Spectrometer Using the Same.

Huang, Min-Zong, et al., Direct Protein Detection from Biological Media Through Electrospray Assisted Laser Desorption Ionization/Mass Spectrometry, Journal of Proteome Research, vol. 5, No. 5, 2006, pp. 1107-1116.

Takats, Zoltan, et al., Mass Spectrometry Sampling Under Ambient Conditions with Desorption Electrospray Ionization, Science Magazine, vol. 306, Oct. 15, 2004, pp. 471-473.

Cody, Robert B., et al., Versatile New Ion Source for the Analysis of Materials in Open Air under Ambient Conditions, Analytical Chemistry, vol. 77, No. 8, Apr. 15, 2005, pp. 2297-2302.

P. Burgos, Z. Lu, A. Ianoul, C. Hnatovsky, M.L. Viriot, L.J. Johnston, and R.S. Taylor, Near-field scanning optical microscopy probes: a comparison of pulled and double-etched bent NSOM probes for fluorescence imaging of biological samples, Journal of Microscopy, vol. 211, Pt 1 Jul. 2003, pp. 37-47, 2003, The Royal Microscopical Society.

R.M. Stockle, Y. D. Suh, V. Deckert, R. Zenobi, Nanoscale chemical analysis by tip-enhanced Raman spectroscopy, Chemical Physics Letters 318 (2000) 131-136, Feb. 18, 2000, 2000 Elsevier Science B.V.

* cited by examiner

PROTEIN MICROSCOPE

CROSS REFERENCE TO RELATED APPLICATIONS

This application claims the benefit of U.S. Provisional Application No. 60/646,994 filed on Jan. 27, 2005.

FIELD OF THE INVENTION

The present invention is directed to an instrument for identifying peptides, proteins and other biomolecules within a tissue or cell and providing information on their spatial and temporal distribution. More particularly, this invention relates to an instrument for identifying peptides, proteins and other biomolecules within a tissue or cell, which provides information on their spatial and temporal distribution down to submicron resolution, and which analyzes their activity in vivo.

BACKGROUND OF THE INVENTION

Living organisms function through the interactions of biomolecules intricately distributed in space and varying in time. Often, spatial variations within a tissue or cell hold the key to understanding the function of molecular components. The abundance of biomolecules can span a wide range. For example, protein concentrations range from millimolar ($10^{-3}$ M) to attomolar ($10^{-18}$ M), and perhaps less. Copy numbers as low as $10^1$ to $10^2$ protein molecules per cell have been reported. Although several analytical methods offer high sensitivity and spatial resolution (fluorescence measurement, voltammetric microelectrodes, etc.), the selectivity and specificity of these methods seldom allows for the unambiguous identification of biochemical species.

With the emergence of sophisticated mass spectrometric methods, such as electrospray ionization (ESI) and matrix-assisted laser desorption ionization (MALDI) mass spectrometry, identification and structural characterization of protein and other components has now become possible. These techniques offer excellent sensitivity (in certain cases down to attomolar) as well as detailed biochemical species information (e.g., protein identification including the detection of post-translational modifications).

In the mass-spectral analysis of biological materials, however, most spatial distribution information is lost during the sample preparation step, wherein cells are ground and thoroughly mixed to form a homogenized slurry which is then placed in a mass spectrometer for analysis. The conventional ESI source is not amenable to molecular imaging, as it requires a liquid sample. The situation can be improved by using MALDI, which involves applying a chemical matrix that is locally excited by laser light so that a plume of sample material is ejected from a focused spot on the sample. In principle, MALDI can be used to recover spatial distributions by collecting molecular information as the laser is rastered across the sample surface. However, three obstacles exist with the MALDI technique. First, the mixing and co-crystallization of the sample with the light-absorbing matrix largely obscures the original spatial distribution of analytes (e.g., through lateral mixing). Second, the need to transfer the sample into a vacuum environment for mass analysis considerably restricts the choice of samples. Significantly, both of these requirements for successful MALDI analysis exclude the possibility of in vivo measurements. The third obstacle associated with the MALDI technique is that the laws of physics and practical considerations limit the focusable size of the laser spot so that it is larger than the wavelength of the laser light, resulting in a laser spot larger than most cells of interest and, thereby, diminishing the value of MALDI in view of the need for sampling from smaller regions.

Thus, there remains a need in the art for an instrument which can not only identify peptides and proteins in a tissue or cell but which also provides information on their spatial and temporal distribution down to submicron resolution and which analyzes their activity in vivo.

SUMMARY OF THE INVENTION

The present invention is based on the discovery that the combined capabilities of scanning near-field optical microscopy (SNOM) imaging, atmospheric pressure-infrared radiation MALDI (AP-IR-MALDI) and mass spectrometry will result in a new solution to investigating cellular material down to a ~100-nm diameter spot. The invention involves the application of SNOM techniques in conjunction with mass spectrometry and AP-IR-MALDI to analyze the chemical composition of biological samples with significantly greater resolution than previously reported. Thus, the present invention provides a system comprising a mass spectrometer (preferably a time-of-flight mass spectrometer), an AP-IR-MALDI apparatus and a scanning near-field optical microscope (SNOM) which are combined so as to transform MALDI mass spectrometry into an in vivo "protein microscope" which provides images of biomolecular distributions in living cells and tissues.

The invention calls for the utilization of a SNOM probe to raster the tip over a sample. Ablated material from individual points is then collected and analyzed in a highly sensitive mass spectrometer. In this way, high-spatial-resolution (down to 100 nm scale) maps of peptide/protein concentration down to the subcellular level and in real time are achieved. The improved resolution is achieved by performing the desorption in the near field zone where the light remains highly collimated to approximately the width of the aperture.

One aspect of the invention is directed to a system for analyzing and imaging a sample containing molecules of interest, the system having:

(A) an atmospheric-pressure or near-atmospheric-pressure ionization region;

(B) a sample holder for holding the sample, the sample holder being disposed within said ionization region, the sample comprising an analyte embedded in an ionization-assisting matrix chosen such that said matrix facilitates ionization of said analyte to form analyte ions upon light-induced release of said analyte from said sample;

(C) a laser for illuminating said sample, to induce said release of said analyte from said sample, and to induce ionization of said analyte to form said analyte ions;

(D) a mass spectrometer having at least one evacuated vacuum chamber and an optional chamber for collision induced dissociation to achieve structural characterization;

(E) an atmospheric pressure interface connecting said ionization region and said mass spectrometer for capturing said analyte ions released from said sample and for transporting said analyte ions to said spectrometer with the possibility of additional ionization;

(F) a scanning near-field optical microscopy instrument comprising (a) a near-field probe configured for apertured or apertureless operation for scanning the sample and for focusing the laser light; (b) a vacuum capillary nozzle for sucking in particles which are desorbed by said laser, the nozzle being connected to an inlet orifice of said atmospheric pressure interface; (c) a scanner platform connected to the sample holder, the platform being movable to a distance within a near-field distance of the probe; and (d) a controller for maintaining distance and recording information about a distance between said probe and said sample, to thereby hold said sample within said distance; wherein an output of said probe has a spot size on said sample substantially equal to an output diameter of said probe;

(G) a means for simultaneously recording topography and mass spectrum measurements made during scanning of the sample with the near-field probe;

(H) a plotting device for plotting said topography and integrated mass spectrum measurements as separate x-y mappings; and (I) means for providing images of the x-y mappings.

In preferred embodiments, the SNOM device has facility for two probes, the second probe being replaced by a vacuum capillary nozzle in our implementation. Also in preferred embodiments, the SNOM device is integrated with an optical microscope, the conventional objective being replaced by one suitable for 3 µm wavelength light in our implementation.

A second aspect of the invention is directed to a method for performing analysis and imaging of a sample comprising an analyte embedded in an ionization-assisting matrix chosen such that said matrix facilitates ionization of said analyte to form analyte ions upon light-induced release of said analyte from said sample, the method comprising:

(1) providing the system of this invention;
(2) causing the laser to emit light of the proper wavelength and intensity;
(3) projecting the light through the near-field probe to form a near field zone;
(4) positioning the sample to be analyzed within the near-field zone;
(5) irradiating the sample with the light to desorb ions from the sample;
(6) sucking the desorbed ions through the vacuum nozzle and into the atmospheric pressure interface;
(7) causing the desorbed ions and optionally post-ionized neutrals to enter the mass spectrometer from the atmospheric pressure interface, to analyze the desorbed ions to determine the chemical composition of the sample; This step includes an option to perform collision induced dissociation for structural characterization;
(8) causing the sample to be scanned by the near-field probe;
(9) at each pixel, measuring topographical vertical height of the sample and measuring a complete mass spectrum;
(10) causing the measurements made in step (9) to be recorded;
(11) causing the recorded topography and mass spectrum measurements to be plotted as separate x-y mappings; and
(12) generating images of the x-y mappings, wherein each color of each pixel represents an ion intensity value.

In the present invention, the combination of MALDI and SNOM transforms MALDI mass spectrometry into an in vivo "protein microscope", which provides never-before-seen details of the distribution of proteins in tissues and living cells, just as the optical microscope has opened up new worlds by allowing scientists to visualize hitherto invisible structures.

The present invention can mitigate and even eliminate the obstacles associated with the conventional MALDI technique.

For example, to replace the artificial organic matrix used in the conventional MALDI technique, the present invention uses mid-infrared laser radiation for the MALDI imaging. At the proposed wavelength of approximately 3 µm, water (the natural medium of living cells) can act as a matrix in the present invention. Thus, tissue sections can be analyzed directly at the cellular level.

A further aspect of the invention involves analyzing the sample using atmospheric pressure (AP) MALDI (as opposed to vacuum MALDI), wherein the sample is mounted in front of the inlet orifice of an AP ion source. The combination of infrared (IR) MALDI with AP MALDI into an AP-IR-MALDI system makes in vivo molecular imaging of proteins in cells and tissues feasible but with relatively poor spatial resolution.

The third obstacle of the conventional MALDI technique which is overcome by the present invention is the coarse spatial resolution of approximately 10 µm for the proposed IR radiation. This is unacceptably large for the study of subcellular structures. To eliminate this obstacle, the present invention incorporates a scanning near-field (SNOM) imaging system to deliver laser energy with sub-wavelength resolution. SNOM circumvents the focusing problem of the conventional MALDI technique by illuminating the sample directly using a sharpened optical fiber with an aperture or a metal tip (apertureless SNOM) rather than with conventional lenses.

By combining SNOM with AP-IR-MALDI, the present invention enables the unique capability for highly specific in vivo molecular imaging with sub-micron lateral resolution.

In total, the combined capabilities of SNOM, AP-IR-MALDI and mass spectrometry result in a new solution to the investigation of cellular material from a spot down to 100-nm in diameter.

The present invention will facilitate high-resolution imaging with frame-by-frame maps of proteins at the sub-cellular level as the organism responds to different stimuli. The invention will make it possible, for example, to study the differences between the protein distributions of healthy cells versus protein distributions of diseased or medicated cells, the protein content of individual organelles, as well as a number of other questions having significant scientific, diagnostic and therapeutic implications.

Another advantage of the present invention is that it provides spatially resolved chemical analysis of the sample correlated with the surface topography. Topographical analysis is achieved by scanning a sharp SNOM probe across the sample at constant distance from the surface. Chemical analysis by means of the laser-induced ionization mass spectrometry is achieved by delivering pulsed laser radiation to the sample surface through the same sharp SNOM probe, and consequent collection and analysis of mass spectra from the plume generated on the sample by the laser radiation.

DETAILED DESCRIPTION OF THE INVENTION

The present invention provides a novel system and method for analyzing and imaging samples of interest. The sample, also referred to as the target material, normally comprises a mixture of analyte materials and light-absorbing matrix substances. The sample can be solid or liquid and is composed of one or more materials selected from the groups consisting of peptides, proteins, lipids, carbohydrates, organic compounds and inorganic compounds. A particularly preferred material comprises tissue samples such as, for example, those disclosed in U.S. Pat. No. 5,808,300, which is hereby incorporated by reference herein in its entirety.

The sample is deposited in a matrix on a target surface of a sample support. When illuminated with the laser beam, the matrix molecules are ionized and evaporated. The ionized matrix molecules subsequently ionize the analyte molecules through charge transfer process. At the same time, the analyte molecules, analyte ions and fragmented analyte ions are evaporated together with the matrix ions and molecules.

When the sample to be analyzed and imaged comprises a biological material (including living matter), the system and method of this invention use an infrared laser and the water content of said material acting as a matrix.

The system and method of the present invention will be described with reference to FIGS. 1-5 herein.

Figure 1:
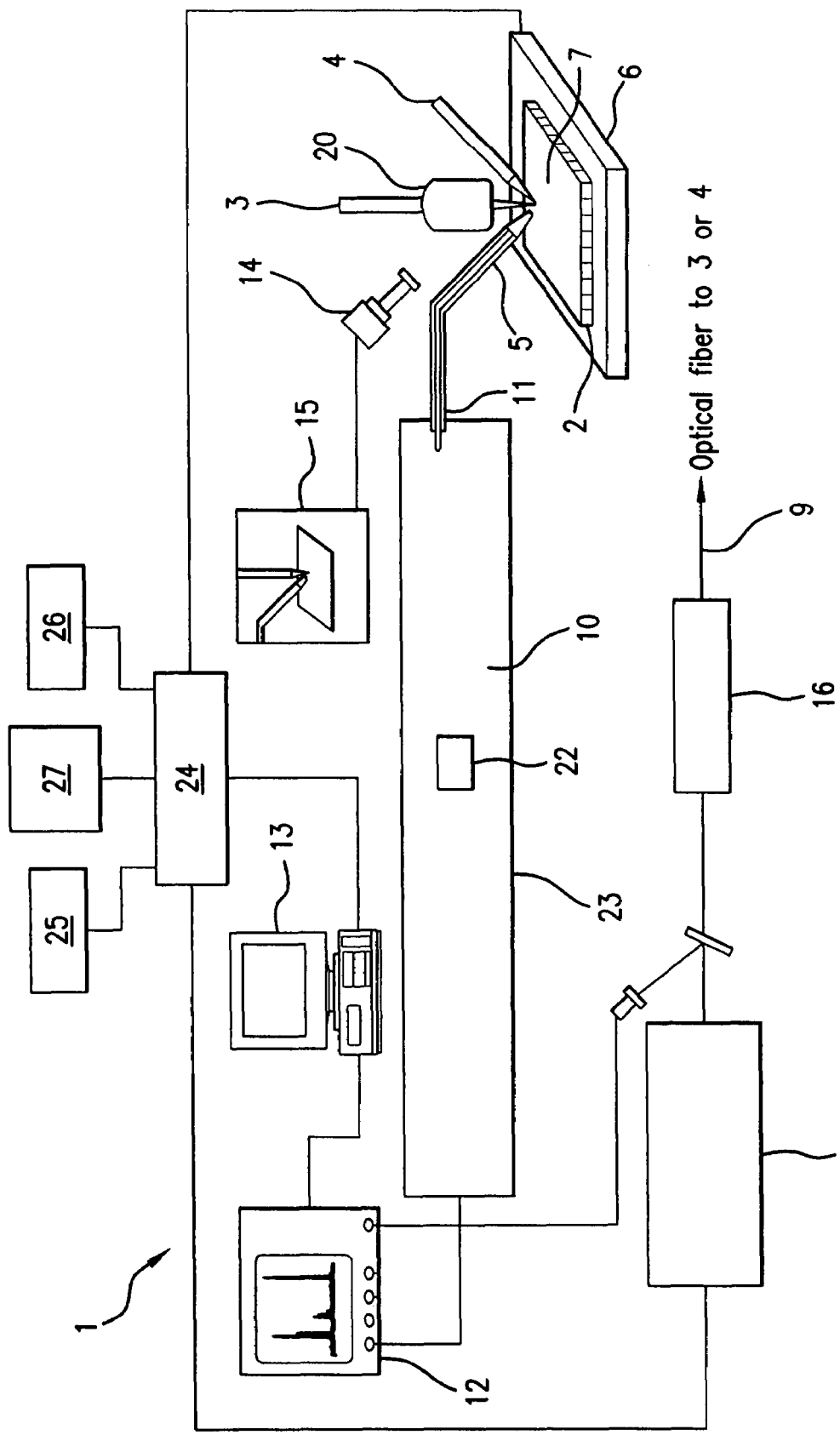
FIG. 1 is a schematic diagram of the system of the present invention.

In FIG. 1, the system of the invention is designated by reference numeral 1. System 1 includes a sample holder 2 for holding a sample 2; a SNOM instrument having a scanning probe 4, which can be implemented in an apertured or an apertureless mode (the latter with the introduction of an external laser beam 3 via a microscope objective 20 suitable for the light's wavelength) an independently scannable vacuum capillary nozzle 5 and a scanner platform 6 (see FIG. 2); (which is preferably piezoelectric-actuated); an atmospheric-pressure or near-atmospheric-pressure ionization region 7; a laser 8; an optical fiber 9 for optically coupling the laser to the near-field probe; a mass spectrometer 10 with an evacuated vacuum chamber 23 and with an optional chamber for collision induced dissociation 22; an atmospheric pressure interface 11 connected to the nozzle 5; a controller 24 for controlling the operation of the SNOM instrument, the mass spectrometer and the laser; a recording device 25; a plotting device 26; an imaging device 27; a data acquisition system 12 and a personal computer 13. System 1 further includes a visualization device, e.g., a CCD camera 14, to help positioning. The camera 14 is connected to a video monitor 15. The system preferably includes an attenuator 16 between laser 8 and fiber 9.

Figure 2:
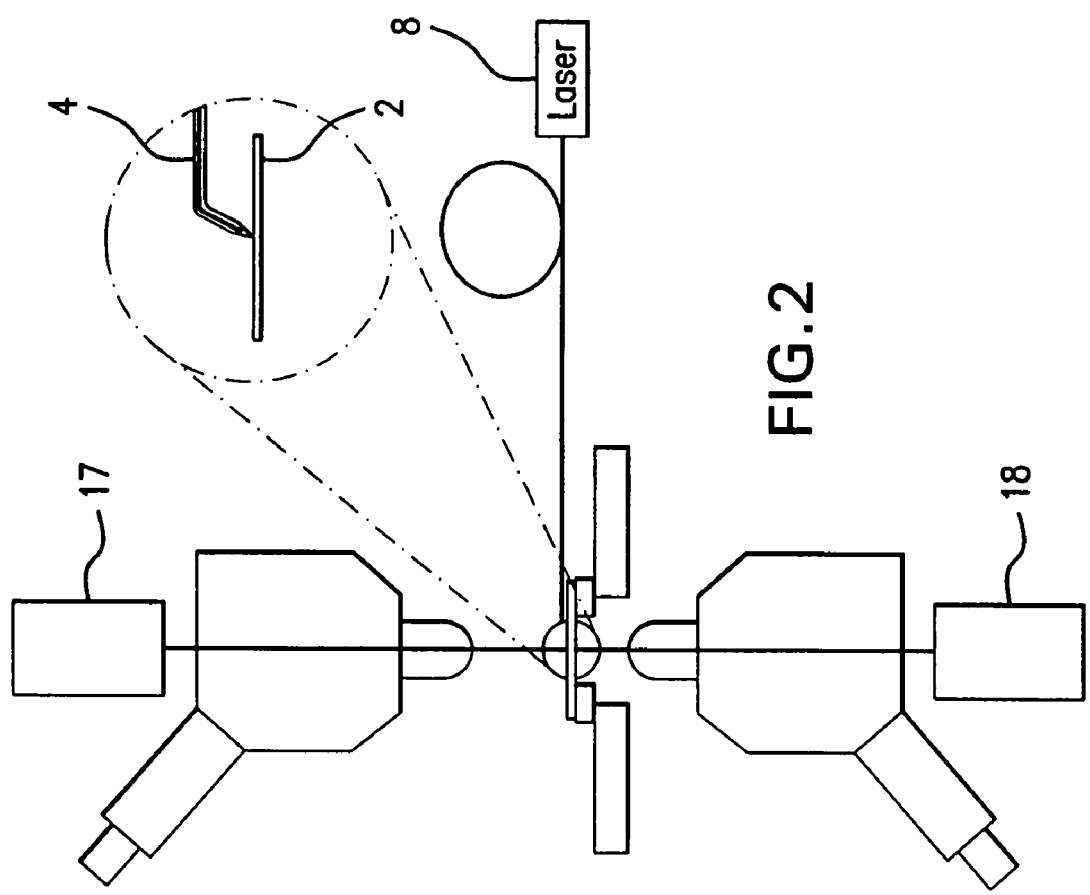
FIG. 2 is a schematic front view of the SNOM instrument, sample holder and scanner platform used in the invention.
Figure 3:
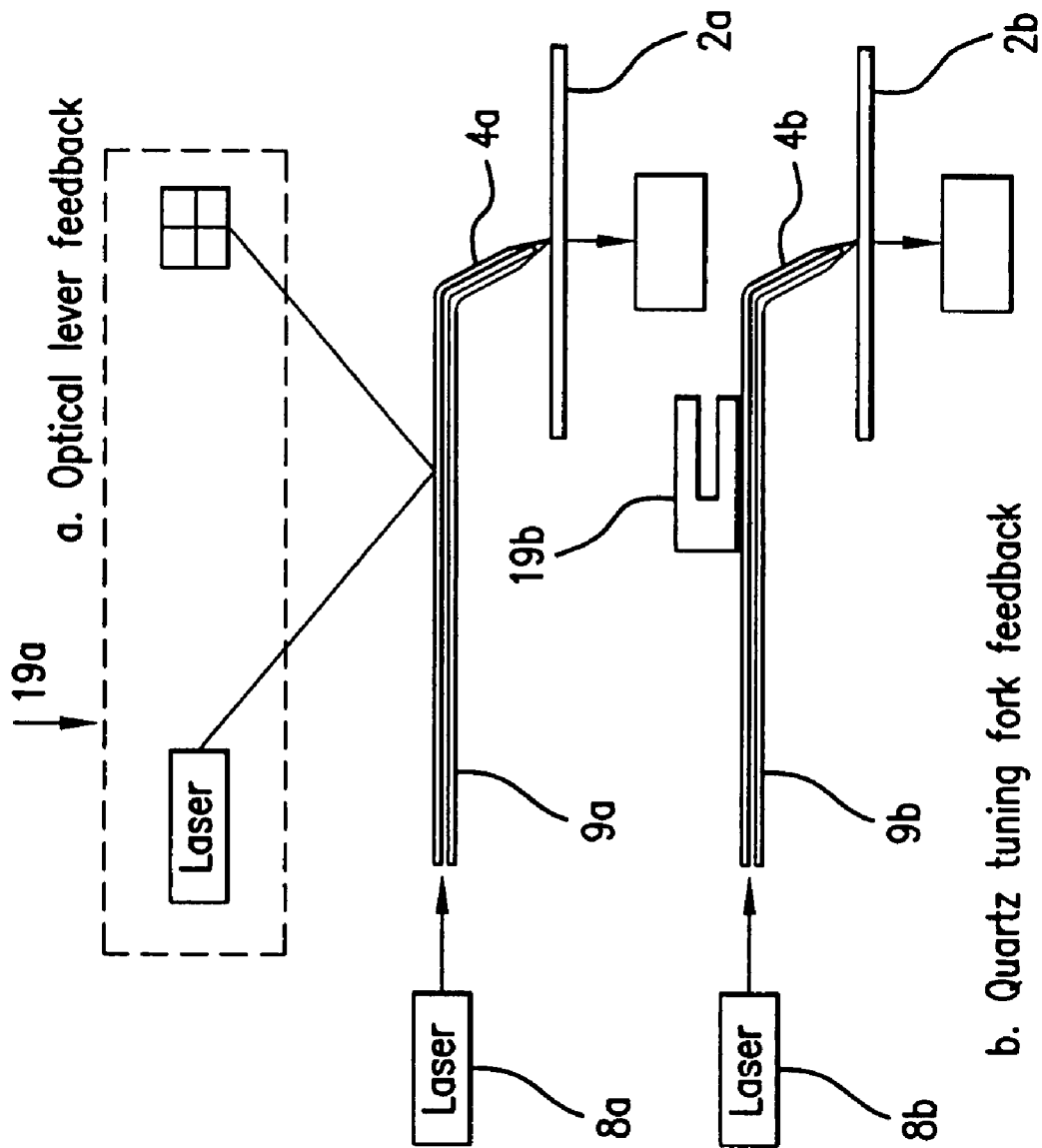
FIG. 3 is a schematic diagram of the portion of the system of the invention composed of the laser, optical fiber, normal force sensor for feedback, SNOM near-field probe, sample holder/scanner platform and collection optics and detector. Two versions of the feedback mechanism are shown, a) the optical lever feedback and b) the quartz tuning fork feedback.

FIG. 2 further shows a reflection detector 17 and a transmission detector 18 which can be used in the system and method of the invention. FIG. 3 further shows two version of the normal force sensor system 19 for feedback. Version a 19a is based on feedback from an optical lever, whereas version 19b uses feedback from a quartz tuning fork.

A sample 2 of the material to be analyzed is placed on sample holder 2. The sample has a surface facing the tip(s) of the SNOM probe(s). The position of the sample relative to SNOM probes 3 and 4 is controlled by scanner platform 6. Scanner platform 6 is preferably a piezoelectric crystal such as, e.g., that disclosed in U.S. Pat. No. 6,080,586, which is incorporated by reference herein. Scanner platform may be operated in the manner disclosed in the aforementioned patent (U.S. Pat. No. 6,080,586).

SNOM devices are known in the art. Reference is made, for example, to U.S. Pat. Nos. 6,466,309; 6,080,586; 5,994,691; all of which are hereby incorporated by reference herein.

The SNOM instrument used in the present invention is preferably of a type that allows the simultaneous acquisition of an atomic force microscopy (AFM) signal and a SNOM signal. A piezoelectric-actuated scanner platform 6 is preferably used for the scanning of the probes relative to the sample and is used to move the surface of the sample into the near-field zone. The scanner platform has either an optical-lever or a quartz-tuning-fork feedback mechanism for SNOM-tip placement and has a facility for relative, simultaneous movement of the sample and of the AP-MALDI vacuum nozzle 5 relative to the SNOM probe 3 (apertureless) or 4 (apertured). An example of a SNOM instrument meeting these requirements is commercially available under the designation Multiview 3000™ and manufactured by Nanonics LLP. The MultiView 3000™ instrument is described, e.g., at the website http://www.nanonics.co.il, which is hereby incorporated by reference herein.

The particular SNOM instrument for use in the present system is a modified form of conventional SNOM instruments and differs from conventional SNOM instruments in several ways. First, if an IR laser is used, the SNOM instrument must couple 3-micron infrared light to the sample rather than visible light. To this end, the instrument must utilize specialty (e.g., chalcogenide, low OH, or sapphire) fibers rather than standard optical fibers. Second, the SNOM instrument used herein is capable of operation in two modes commonly designated as "apertureless" (wherein laser beam 3 is focused to illuminate a sharp metal tip 4) and "apertured" (wherein probe 4 is an optical fiber and has a sub-wavelength integrally-formed aperture at a tip thereof). In the apertureless mode, a large (e.g., 10 micron) spot of infrared light 3 illuminates a suitably shaped and sharpened metal tip 4 placed a few nanometers from the sample's surface; excitation is delivered through a sharpened, metallized fiber which in this case makes up the probe 4. Thus, in the apertured mode, only the highly-localized, near-field zone is illuminated, but at a slightly lower intensity than in the apertureless mode. One skilled in the art will select between apertured vs. apertureless mode based upon the IR-absorptivity of the sample. Third, the SNOM instrument used in the present invention, unlike conventional SNOM instruments, is fitted with an independently scannable vacuum nozzle 5 that serves as a part of the atmospheric pressure interface.

The SNOM device used in the present invention can have a single probe 4 or dual probes. An example of a SNOM device which can be used in the present invention is disclosed, e.g., in U.S. Pat. No. 6,080,586, which is hereby incorporated by reference herein. A preferred dual-probe SNOM device for use in the invention is the "MultiView 3000™" instrument discussed above.

The MultiView 3000™ SNOM instrument has two probes in contact with a single sample with one probe scanning relative to the other. In the SNOM instrument used in the present invention, one probe can be used to illuminate a precise point on a sample while a sharpened capillary serving as the vacuum nozzle can replace the second probe.

The system and method of this invention may use a UV or infrared laser 8, with the latter being preferred, particularly when the sample to be analyzed and imaged comprises biological tissue or cells.

The atmospheric-pressure or near-atmospheric-pressure ionization region 7 used in the system of this invention is designed to control the gas nature, pressure, temperature, and humidity to maintain the integrity of the sample and/or facilitate ionization. In some cases, additional equipment is incorporated in the ionization region to control these parameters, such as a heater to control the temperature. The ionization region may include a gas inlet as a pathway for gas to enter the atmospherically-controlled region. The ionization region may be filled with a bath gas at or near atmospheric pressure. The bath gas, which is normally selected from the group which comprises inert gas, nitrogen gas, and gas mixture such as air, is chosen such that it does not react with the sample at ambient conditions or even under laser illumination.

If the ionization region is an enclosed structure, e.g., a chamber, it further comprises a window through which the illuminating laser beam may enter in the apertureless mode. The position of the window is correlated to the position of the sample to be illuminated inside the ionization chamber. In a preferred embodiment, the window is positioned at the top or bottom of the chamber directly above or below the SNOM tip.

Figure 4:
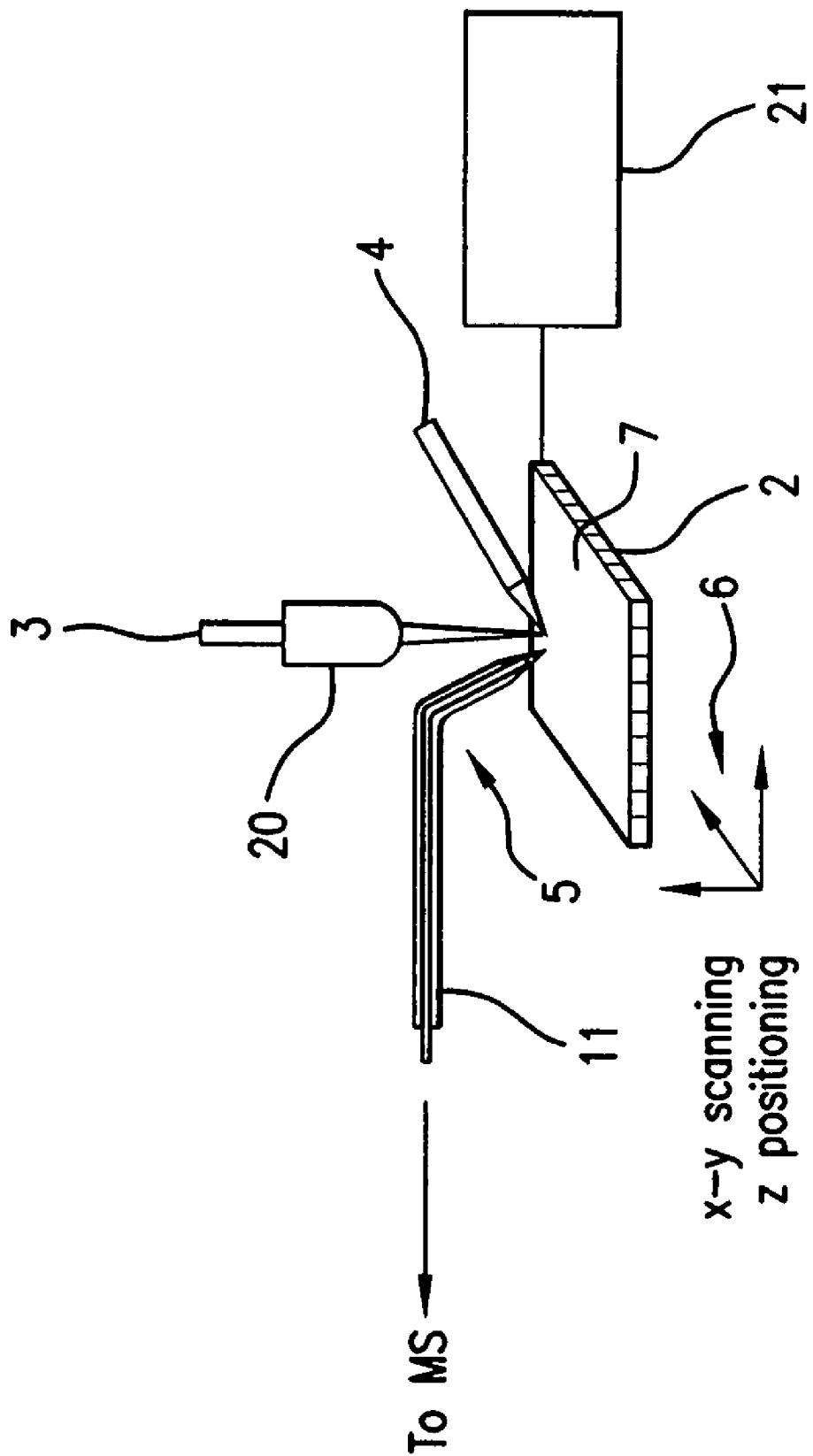
FIG. 4 is a schematic close-up view of the portion of the system of the invention composed of the ionization region, the SNOM near-field probe, the vacuum capillary nozzle, the sample holder, during the scanning step of the method of the invention.

FIG. 4 shows the details of the ionization region of the system. Normally, the sample holder 2 is positioned inside the ionization region (or chamber) so that the deposited sample is close to the inlet orifice of the atmospheric pressure interface between the ionization region and the spectrometer, and so that the sample is easily illuminated by the laser beam. The sample holder is normally selected from the group comprising insulating materials and conductive materials. If the sample holder is conductive, it is normally used as an electrode to provide a constant or time dependent electric field that moves the ionized analyte from the target surface to the inlet orifice on the AP interface through which the ionized analyte enters the spectrometer. The electric field is generated by a constant or time dependent high voltage power supply 21. For the use of time dependent electric fields for the efficient transfer of ions into a mass spectrometer, reference is made to U.S. Pat. No. 6,791,080 which is hereby incorporated by reference herein. If the sample holder is insulating, a separate electrode behind the sample holder may be needed to provide the electric field required for ion transportation.

The constant or time dependent electric potential of the inlet orifice and the other electrodes, such as the sample support, is adjusted to achieve the best signal from the spectrometer. The adjustment technique is conventional to a person skilled in the art.

The atmospheric pressure (AP) interface 11 used in the system and method of this invention connects the ionization region 7 to the mass spectrometer 10 and entrains the plume of particles (neutrals, ions and particulates) generated by the laser pulse. The AP interface used in the invention is modified to accommodate the MALDI source and parts of the SNOM system. In the AP interface, a protruding metal capillary (i.e., the nozzle 5) is attached to the inlet orifice to facilitate the probing of the laser-generated plume over the sample. Capillaries of 10-35 cm in length with an inner diameter ranging from 100 μm to 800 μm and with the option of heating are preferably used to maximize ion transmission efficiency and minimize the gas load on the mass spectrometer at the same time. Nozzle 5 collects the laser plume generated in the ionization region and directs the plume to the mass spectrometer. The heating of the capillary facilitates ion transport into the mass spectrometer. The AP interface used in the present invention differs from commercially available AP interfaces used for electrospray and MALDI techniques in that the inlet orifice of the AP interface used in the invention has a very small inlet orifice. This is because the laser plume generated by the MALDI/SNOM technique in the present invention is very small, down to 100 nm in size.

In the AP interface region, the efficient transport and/or collection of laser-generated ions requires special transfer (e.g., ion guide) and/or storage (e.g., ion trap) ion optics. In addition, the sensitivity of detection can be enhanced by ionizing the entrained neutrals. This additional ionization process (e.g., chemical ionization) takes advantage of the neutrals desorbed by the laser pulse.

The mass spectrometer 10 used in the system and method of this invention is preferably an orthogonal acceleration time-of-flight (TOF) mass spectrometer because it efficiently combines an atmospheric pressure interface with the high transmission and high-duty-cycle capabilities of the TOF mass spectrometer. Orthogonal acceleration TOF mass spectrometers are known in the art. Reference is made, e.g., to U.S. Pat. Nos. 5,117,107 and 6,855,924, which are hereby incorporated by reference herein.

From the collisional damping interface, ions are injected into the source region perpendicular to the axis of the reflectron type TOF mass spectrometer. The pressure in the ion transport region is in the 50 to 100 mTorr range. An optional collision cell is placed in the ion beam path. If this cell is filled with collision gas (e.g., argon) the sample ions undergo collision induced dissociation (CID). The resulting fragment ions can be analyzed by the mass spectrometer to produce structural information. Once the ions fill the ejection region, they are accelerated along the reflectron axis by an ejection pulse of ~3 kHz frequency. Ion packets are detected by a dual multichannel plate detector and the corresponding signal is captured by a fast data acquisition system 12. An example of an orthogonal acceleration TOF mass spectometer meeting these requirements is commercially available under the designation QTOF Premier and manufactured by Waters Co.

In the method of the present invention, the sample holder with attached sample is placed on the bed of the sample scanner, and the SNOM head is positioned over the top of the sample. The IR laser beam is injected into the optical fiber if the SNOM probe is apertured or focused on the metal tip if the probe is apertureless. For SNOM instruments utilizing optical feedback, the optical cantilever system is aligned to produce a maximum signal from a four-quadrant photodiode (e.g., 2 volts or more). The mechanical oscillator frequency is tuned to a resonance of the SNOM fiber. The preferred frequency is between 20 and 100 kHz and the peak should have a signal-to-noise value of at least 25.

The SNOM near-field probe 3 is lowered to the sample surface in the automatic mode. Once the probe tip 3A comes to close contact with the sample, the vertical servo motor will shut off, and automatic-feedback positioning commences. The position of nozzle 5 and nozzle tip 5A are adjusted to attain the maximum signal on the mass spectrometer. The sample is scanned in the horizontal plane beneath the SNOM probe tip 13A. At each pixel, the topographical vertical height of the sample and a complete mass spectrum are measured. These measurements are recorded by the computer controller and the topography and mass spectrum are plotted, in real time, as separate x-y mappings in which the color of each pixel on the computer monitor screen represents the value of the intensity of the particular ions selected.

With the sample and the SNOM probe in place, an appropriate voltage difference (e.g., up to 3 kV) is applied between the sample holder and the collection nozzle. The transfer capillary is heated to ~100° C. to minimize adsorption of the particles to its wall. As noted previously, the mass spectrometer used in the present invention is preferably an orthogonal acceleration TOF mass spectrometer which has been modified as described hereinabove. The ion transfer optics, accelerating and ion focusing voltages and the injection times are optimized for the best ion signal. At the current state of technology, the data acquisition rate is limited by the repetition rate of the laser. As the mid-IR laser sources in the required ~10 mJ/pulse energy range are available with a maximum repetition rate of 10 Hz, the spectrum collection from a surface point, even under ideal conditions, requires 100 ms.

Figure 5:
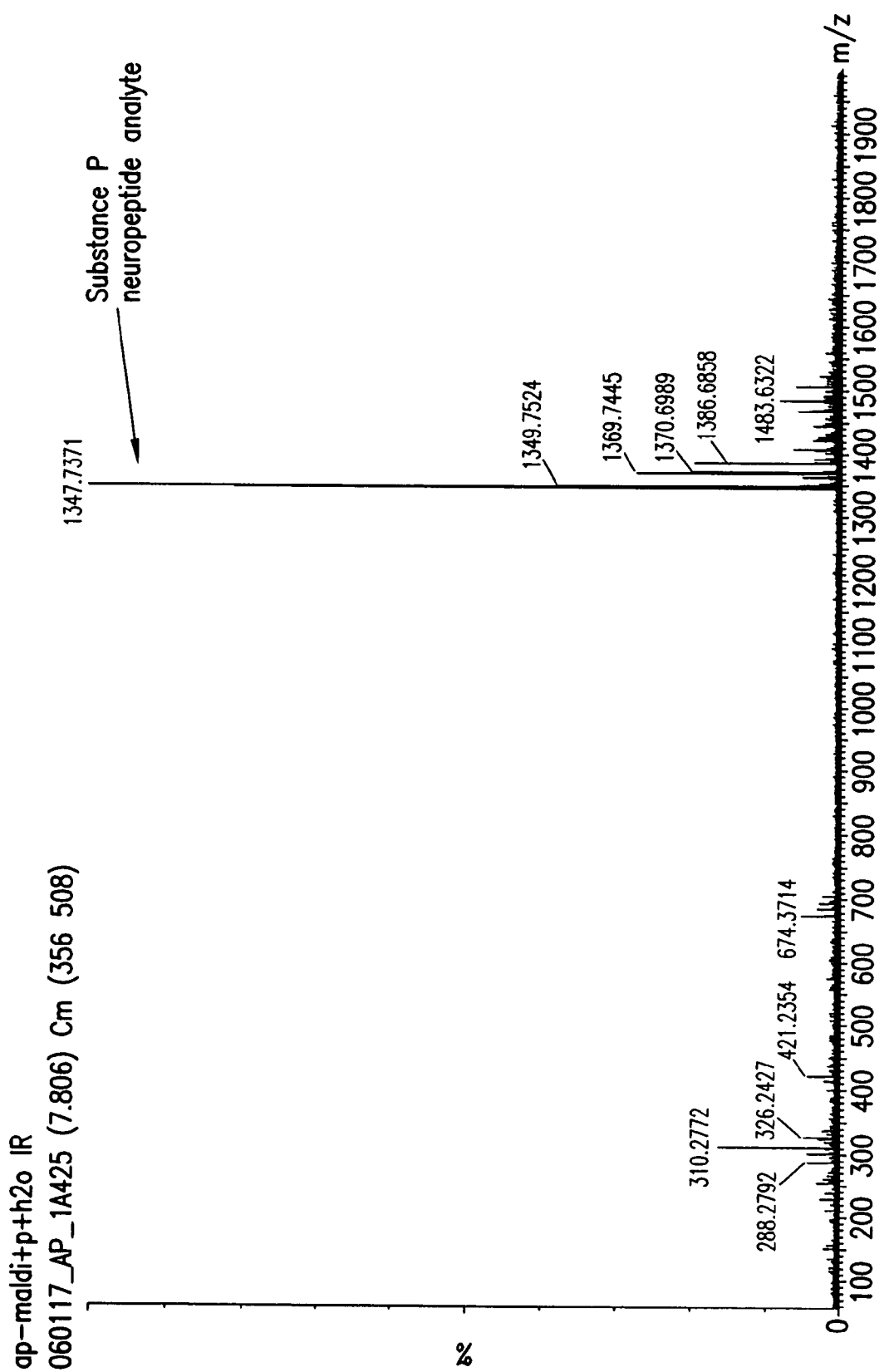
FIG. 5 is an atmospheric pressure infrared MALDI mass spectrum of the neuropeptide substance P from liquid water as the matrix. The mid-infrared laser radiation at the wavelength of 2.94 µm was focused on the target with conventional optics in the far field limit.

Once a mass spectrum with at least a signal-to-noise ratio of 3 is collected at a particular location on the sample, the sample is moved to the next interrogation point. Such a mass spectrum is shown in FIG. 5. This spectrum was collected using said atmospheric pressure interface 11, on a QTOF Premier mass spectrometer using mid-infrared laser radiation at 2.94 μm in the far field limit. The sample, neuropeptide substance P, was desorbed and ionized from liquid water as the matrix. The signal-to-noise ratio can be improved by spectrum averaging techniques. Identification of an unknown species can be facilitated by the introduction of a collision chamber (not shown) between the ion transfer optics and the orthogonal acceleration region. Elevating the pressure of, for example, argon gas in this collision chamber results in fragmentation of the primary ions. Detecting these fragment ions can contribute to the identification of the primary ions.

Following the scan, the data are analyzed by producing false color mappings of the intensity of selected peaks. Similarly, to the spectra and height data plotted during the measurements, the color of each pixel in the image of the sample is determined by the intensity of the peak of interest at that position on the sample.

As mentioned above, the present invention provides spatially resolved chemical analysis of the sample correlated with the surface topography. Topographical analysis is achieved by scanning a sharp SNOM probe across the sample at constant distance from the surface. Chemical analysis by means of the laser-induced ionization mass spectrometry is achieved by delivering pulsed laser radiation to the sample surface through the same sharp SNOM probe, and consequent collection and analysis of mass spectra from the plume generated on the sample by the laser radiation. The chemical and topographical analysis may be carried out, for example, in the manner taught in U.S. Pat. No. 6,466,309.

EXPERIMENTAL

This example illustrates an attempt to define the surface proteome (or internal cellular components including cytoplasmic and/or nuclear), using securely attached cells. Cell tissues or non-adherent cells may require specific ligands to securely attach live cells to slides prior to use in the system of this invention. In this example, samples are prepared using multiple reagents for cell attachment, including use of coated, inorganic substances (e.g., glass, silicon, mica). The slides may contain any of the established attachment chemicals including, polystyrene, 3-aminopropylsilane, poly-L-lysine, poly(ethylene-imine) (PEI), poly(ethylene glycol)(PEG) photolithography, cell-adhesive ligands, chitosan, fibronectin, laminin, collagen type I, or specific antibodies (i.e., anti-CD5 or anti-CD19 antibodies), to engineer specific cell-surface interactions within the individual slide areas.

For most non-living biological samples (e.g., tissue sections), near-UV light can be used for ion generation. This is significant when defining specific protein/nucleic acid interactions, since illumination at both 365 and 410 nm results in significant cross-linking of proteins with the DNA. As an alternative, a non-invasive live-cell measurement of changes using long-wavelength light (i.e., 710 nm) may be used. However, for most living biological samples, it is DNA. As an alternative, a non-invasive live-cell measurement of changes using long-wavelength light (i.e., 710 nm) may be used. However, for most living biological samples, it is preferred to use focused, near-infrared laser light scanned across a field of the cell. The response of the cell to the laser may depend on its size, structure, morphology, composition, and surface membrane properties. Viability of cells is determined by means of molecular probes for fluorescence microscopy (Live/Dead kit-double staining with calcein AM and ethidium homodimer). Both UV and IR methods described here will allow quantitative measurements of cellular components with their functional parameters intact.

In this example, the eggs of the African clawed frog *Xenopus laevis* are studied. These eggs are relatively large in size (~1 mm), thus provide an excellent test case for live imaging. Analyte loading in a single *Xenopus* egg is calculated based on the average concentration of various proteins. For example, the proteins p13Suc and Cdc25 are present at 2.5 μM and 0.14 μM concentrations in the eggs, respectively. The volume of a typical egg is ~0.9 μL (the diameter is between 1.0 and 1.3 mm). Thus, putting a single egg on the sample holder results in loadings of p13Suc and Cdc25 of 2 pmol and 0.1 pmol, respectively. The demonstrated detection limit for small peptides using AP-MALDI with IT-MS is in the low femtomole range.

Other proteins that may be present on the cell surface of most cells, including those of the *Xenopus* egg, include:

ATP binding . . . DEAD/H (Asp-Glu-Ala-Asp/His) box polypeptide 1, sodium-potassium-transporting ATPase Ca+binding . . . Annexin I, annexin V, annexin VI, annexin A2, calreticulin, alpha-actin Chaperone . . . Cyclophilin A, glucose-regulated protein, heat shock protein 70 kDa, heat shock protein 90 kDa, Tumor rejection antigen Cytoskeleton . . . a-Actin, b-actin, cofilin, filamin, keratin, moesin, a-tubulin, b-tubulin, vimentin (actin sizes are 41-42 KD)

Enzymes . . . Acminopeptidase N, transketolase, vinculin

Glycolysis . . . Anolase, glyceraldehydes-3-phosphate dehydrogenase, lactate dehydrogenase, phosphoglycerate kinase, serine/threonine protein phosphatase PP1, triosephosphate isomerase Protein transport . . . ADP-ribosylation factor 4, clathrin, polyubiquitin 3, b-RAB GDP dissociation inhibitor, Ca and Cl channels Signal transduction . . . a1-Casein kinase 2, 14-3-3 protein (four isoforms), receptor tyrosine kinases Transcription-translation . . . Eukaryotic translation elongation factor 2, eukaryotic translation elongation factor 1, enhancer protein, eukaryotic translation initiation factor 4A In the present example, the substrate with attached sample is placed on the bed of the sample scanner, and the SNOM head is positioned over the top. The IR laser beam is injected into the optical fiber for the apertured mode, or focused on the metal tip for the apertureless mode. The optical cantilever system is aligned to produce a maximum signal from the four-quadrant photodiode (2 volts or more), and the mechanical oscillator frequency is tuned to a resonance of the SNOM fiber (the preferred frequency is between 20 and 100 kHz, the peak should have an intensity a signal-to-noise value of at least 25). The effective force at the peak is noted and the control force is set about 30% lower than this value). Next the SNOM head is lowered to the sample surface in the automatic mode. Once the tip comes to close contact, the vertical servo motor is shut off, and automatic-feedback positioning commences. The MALDI nozzle position is adjusted to attain the maximum signal on the mass spectrometer. The sample is scanned in the horizontal plane beneath the SNOM tip. With the sample and the SNOM head in place, an appropriate voltage is applied to the sample holder (e.g., 2 kV) and the transfer capillary is heated to ~100° C. to minimized adsorption of the particles to its wall. An orthogonal acceleration TOF mass spectrometer is used. The ion transfer optics, accelerating and ion focusing voltages and the injection times are optimized for best ion signal.

Once a mass spectrum with at least a signal-to-noise ratio of 3 is collected at a particular location on the sample (see, e.g., FIG. 5), the sample is moved to the next interrogation point.

At each pixel, the topographic vertical height of the sample and a complete mass spectrum are measured. These are recorded by a computer controller and the topography and mass spectrum are plotted, in real time, as separate x-y mappings in which the color of each pixel on the screen represents the value of the intensity of the particular ion selected.

Following the scan, the data are analyzed by producing false color mappings of the intensity of selected peaks. Similarly to the spectra and height data plotted during the measurements, the color of each pixel in the image of the sample is determined by the intensity of the peak of interest at that position on the sample.

The foregoing description of the invention is thus illustrative and explanatory, and various changes in the equipment, as well as in the details of the methods and techniques disclosed herein may be made without departing from the spirit of the invention, which is defined by the claims.

What is claimed is:

1. A system for analyzing and imaging a sample containing molecules of interest, the system having:
(A) an atmospheric-pressure or near-atmospheric-pressure ionization region;
(B) a sample holder for holding the sample, the sample holder being disposed within said ionization region, the sample comprising an analyte embedded in an ionization-assisting matrix chosen such that said matrix facilitates ionization of said analyte to form analyte ions upon light-induced release of said analyte from said sample;
(C) a laser for near field illumination of said sample, to induce said release of said analyte from said sample, and to induce ionization of said analyte to form said analyte ions;
(D) a mass spectrometer having at least one evacuated vacuum chamber;
(E) an atmospheric pressure interface connecting said ionization region and said mass spectrometer (a) for capturing said analyte ions and neutrals released from said sample, (b) for subjecting the neutrals to additional ionization or post ionization, and (c) for transporting said analyte ions to said spectrometer;
(F) a scanning near-field optical microscopy instrument comprising (a) a near-field apertureless probe in which said laser is focused onto a sharp metal or metalized tip for scanning the sample; (b) a vacuum capillary nozzle with heating for sucking in particles which are desorbed by said laser, the nozzle being connected to an inlet orifice of said atmospheric pressure interface; (c) a scanner platform connected to the sample holder, the platform being movable to a distance within a near-field distance of the probe; and (d) a controller for maintaining distance information about a distance between said probe and said sample, to thereby hold said sample within said distance; wherein an output of said probe has a spot size on said sample roughly equal to the output diameter of said probe;
(G) a recording device for recording topography and mass spectra made during scanning of the sample with the near-field probe;
(H) a plotting device for plotting said topography and mass spectrum measurements as separate x-y mappings; and
(I) an imaging device for providing images of the x-y mappings.

2. A system according to claim 1, wherein the scanning near-field probe having a sub-wavelength apex integrally formed at a tip thereof, the scanning near-field optical microscopy instrument further comprises a fiber optic cable for carrying light from the laser.

3. A system according to claim 1, wherein the laser is an infrared laser.

4. A system according to claim 1, wherein the scanning near-field optical microscopy instrument comprises facility for two probes for scanning the sample, wherein a first probe is used to illuminate a precise point on a sample while a second probe is modified to be said vacuum capillary nozzle with heating for collecting analyte ions, and further comprising a positioning device for independently controlling the position of the first probe and the second probe.

5. A system according to claim 1, wherein the mass spectrometer is time-of-flight mass spectrometer.

6. A system according to claim 1, further comprising a time dependent high voltage power supply for generating a time dependent electric field for transporting said analyte ions to said atmospheric pressure interface, said electric field having electric pulses which are applied directly to the vacuum capillary nozzle.

7. The system of claim 1, wherein said laser operates at a 2.94 micrometer wavelength.

8. The system of claim 1, wherein said mass spectrometer further comprises a chamber for collision induced dissociation to achieve structural characterization.

9. A method for performing analysis and imaging of a sample comprising an analyte embedded in an ionization-assisting matrix, whereby said matrix facilitates ionization of said analyte to form analyte ions upon light-induced release of said analyte from said sample, the method comprising:
(1) providing a system for analyzing and imaging a sample, the system having:
(A) an atmospheric-pressure or near-atmospheric-pressure ionization region;
(B) a sample holder for holding the sample, the sample holder being disposed within said ionization region, the sample comprising an analyte embedded in an ionization-assisting matrix chosen such that said matrix facilitates ionization of said analyte to form analyte ions upon light-induced release of said analyte from said sample;
(C) a laser for illuminating said sample, to induce said release of said analyte from said sample, and to induce ionization of said analyte to form said analyte ions;
(D) a mass spectrometer having at least one evacuated vacuum chamber;
(E) an atmospheric pressure interface connecting said ionization region and said mass spectrometer for capturing said analyte ions released from said sample, subjecting the neutrals to additional ionization or post ionization, and for transporting said analyte ions to said spectrometer; and (F) a scanning near-field optical microscopy instrument comprising (a) an apertureless near-field probe in which said laser is focused onto a sharp metal or metalized tip for scanning the sample; (b) a vacuum capillary nozzle with heating for sucking in particles which are desorbed by said laser, the capillary nozzle being connected to an inlet orifice of said atmospheric pressure interface; (c) a scanner platform connected to the sample holder, the platform being movable to a distance within a near-field distance of the probe; and (d) a controller for maintaining distance information about a current distance between said probe and said sample, to thereby hold said sample within said distance; wherein an output of said probe has a spot size on said sample roughly equal to an output diameter of said probe;

(G) a recording device for recording topography and mass spectrum measurements made during scanning of the sample with the near-field probe; and (H) an imaging device for providing images of the x-y mappings;

(2) causing the laser to emit light of the proper wavelength and intensity;

(3) projecting the light onto the near-field probe to form a near field zone;

(4) positioning the sample to be analyzed within the near-field zone;

(5) irradiating the sample with the light to desorb ions and neutrals from the sample;

(6) sucking the desorbed ions and neutrals through the vacuum nozzle with heating and into the atmospheric pressure interface;

(7) causing the desorbed ions and neutrals to enter the mass spectrometer from the atmospheric pressure interface;

(8) causing the sample to be scanned relative to the near-field probe;

(9) at each pixel, measuring topographical vertical height of the sample and measuring a complete mass spectrum;

(10) causing the measurements made in step (9) to be recorded; and

(11) generating images of the x-y mappings, wherein each color of each pixel represents an ion intensity value.

10. A method according to claim 9, wherein the sample consists of an analyte embedded in the ionization-assisting matrix, and the analyte in said sample comprises at least one material selected from the groups consisting of peptides, proteins, lipids, carbohydrates, metabolites, organic compounds and inorganic compounds.

11. A method according to claim 9, wherein the sample consists of an analyte embedded in the ionization-assisting matrix, and the analyte comprises a biological material comprising living matter, further wherein the matrix comprises the water content of the sample.

12. A method according to claim 11, wherein the laser used in the method is an infrared laser.

13. A method according to claim 9, wherein said additional ionization is chemical ionization for near field ablation.

14. A method according to claim 9, wherein the matrix comprises the water content of the sample and the laser used in the method is an infrared laser.

15. A method according to claim 9, further comprising applying a time dependent electric field to transport said desorbed ions to the atmospheric pressure interface, said electric field having electric pulses which are applied directly to the vacuum capillary nozzle.

16. The method of claim 9, wherein said laser operates at a 2.94 micrometer wavelength.

17. The method according to claim 9, wherein said additional ionization is electrospray ionization for near field ablation.

18. The method of claim 9, wherein the mass spectrometer further comprises a chamber for collision induced dissociation to achieve structural characterization.

19. The method of claim 9, wherein the mass spectrometer further comprises a post ionization region, and said method comprises postionizing the neutrals at the postionization region.

20. The method of claim 9, wherein said step of causing the desorbed ions and neutrals to enter the mass spectrometer, fragment in a collision cell and to analyze them to determine the chemical composition of the sample.

* * * * *